(12) United States Patent
Scaglione et al.

(10) Patent No.: US 10,651,955 B2
(45) Date of Patent: May 12, 2020

(54) ACTIVE SEQUENTIAL XAMPLING RECEIVER FOR SPECTRUM SENSING

(71) Applicants: Anna Scaglione, Phoenix, AZ (US);
Lorenzo Ferrari, Scottsdale, AZ (US)

(72) Inventors: Anna Scaglione, Phoenix, AZ (US);
Lorenzo Ferrari, Scottsdale, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 16/251,728

(22) Filed: Jan. 18, 2019

(65) Prior Publication Data
US 2019/0229820 A1 Jul. 25, 2019

Related U.S. Application Data

(60) Provisional application No. 62/619,291, filed on Jan. 19, 2018.

(51) Int. Cl.
*H04B 17/26* (2015.01)
*H04B 17/309* (2015.01)
*H04B 17/23* (2015.01)
*H04B 17/391* (2015.01)

(52) U.S. Cl.
CPC ............. *H04B 17/26* (2015.01); *H04B 17/23* (2015.01); *H04B 17/309* (2015.01); *H04B 17/391* (2015.01); *H04B 17/3912* (2015.01); *H04B 17/3913* (2015.01)

(58) Field of Classification Search
CPC ....... H04B 17/26; H04B 17/23; H04B 17/309
See application file for complete search history.

(56) References Cited

U.S. PATENT DOCUMENTS

| 6,246,827 B1* | 6/2001 | Strolle | H04N 5/923 348/392.1 |
| 7,436,912 B2* | 10/2008 | Fudge | H04B 1/0003 375/340 |
| 8,457,579 B2* | 6/2013 | Mishali | H04B 1/0092 455/130 |
| 8,660,218 B2* | 2/2014 | Maleh | G01R 23/16 375/316 |

(Continued)

OTHER PUBLICATIONS

Ariananda, Dyonisius, et al., "Compressive Wideband Power Spectrum Estimation," IEEE Transactions on Signal Processing, vol. 60, Issue 9, Sep. 2012, pp. 4775-4789.

(Continued)

*Primary Examiner* — Lewis G West
(74) *Attorney, Agent, or Firm* — Withrow & Terranova, P.L.L.C.

(57) ABSTRACT

An active sequential xampling receiver for spectrum sensing is disclosed. The receiver includes a dynamically adjustable analog front end to perform sub-Nyquist energy sensing across a broad radio frequency (RF) spectrum. In an exemplary aspect, the receiver includes a dynamic modulator which modulates the broad RF spectrum to dynamically select sub-bands (e.g., RF channels) and fold their spectral content into a narrower baseband signal for energy detection. A controller adjusts the dynamic modulator to maximize utility of the spectrum detection based on past energy observations.

12 Claims, 5 Drawing Sheets

(56) References Cited

U.S. PATENT DOCUMENTS

| | | | | |
|---|---|---|---|---|
| 8,717,210 | B2* | 5/2014 | Eldar | H03M 1/121 |
| | | | | 341/122 |
| 8,836,557 | B2* | 9/2014 | Eldar | H03K 5/00 |
| | | | | 327/91 |
| 9,143,194 | B2* | 9/2015 | Eldar | H03M 1/1245 |
| 9,660,693 | B1* | 5/2017 | Ni | H04B 1/715 |
| 2004/0228421 | A1* | 11/2004 | Simon | H03C 3/406 |
| | | | | 375/296 |
| 2006/0262833 | A1* | 11/2006 | Durand | H04B 1/30 |
| | | | | 375/143 |
| 2007/0098057 | A1* | 5/2007 | Mori | H04B 1/001 |
| | | | | 375/219 |
| 2009/0046803 | A1* | 2/2009 | Meyer | H04B 1/04 |
| | | | | 375/295 |
| 2009/0221256 | A1* | 9/2009 | Sahinoglu | H04B 1/719 |
| | | | | 455/307 |
| 2010/0020850 | A1* | 1/2010 | Navarro Rodero | H04B 1/7183 |
| | | | | 375/130 |
| 2010/0159866 | A1* | 6/2010 | Fudge | H04B 1/1036 |
| | | | | 455/302 |
| 2013/0195226 | A1* | 8/2013 | Maleh | G01R 23/16 |
| | | | | 375/340 |
| 2016/0150415 | A1* | 5/2016 | Laneman | H04W 16/14 |
| | | | | 455/452.2 |
| 2017/0041170 | A1* | 2/2017 | Shin | H04L 27/0006 |
| 2017/0093603 | A1* | 3/2017 | Hu | H04B 1/69 |
| 2017/0315221 | A1* | 11/2017 | Cohen | G01S 13/347 |
| 2018/0083816 | A1* | 3/2018 | Bolstad | G01S 3/74 |
| 2018/0139629 | A1* | 5/2018 | Chakrabarti | H04W 24/02 |
| 2019/0149191 | A1* | 5/2019 | Shmel | H04B 1/71637 |
| | | | | 375/139 |

OTHER PUBLICATIONS

Arias-Castro, Ery, et al., "Noise Folding in Compressed Sensing," IEEE Signal Processing Letters, vol. 18, Issue 8, Aug. 2011, pp. 478-481.

Atia, George, et al., "Boolean Compressed Sensing and Noisy Group Testing," IEEE Transactions on Information Theory, vol. 58, Issue 3, 2012, 33 pages.

Bagheri, Saeed, et al., "The Restless Multi-Armed Bandit Formulation of the Cognitive Compressive Sensing Problem," IEEE Transactions on Signal Processing, 2015, 16 pages.

Baron, Dror, et al., "Bayesian Compressive Sensing via Belief Propagation," IEEE Transactions on Signal Processing, Jun. 2009, 25 pages.

Braun, Gabor, et al., "Info-Greedy Sequential Adaptive Compressed Sensing," Annual Allerton Conference, Oct. 2014, IEEE, pp. 858-865.

Chan, Chun, et al., "Non-adaptive probabilistic group testing with noisy measurements: Near-optimal bounds with afficient algorithms," Allerton Conference on Communication, Control, and Computing, Jul. 2011, IEEE, 9 pages.

Chen, Laming, et al., "A Calibration System and Perturbation Analysis for the Modulated Wideband Converter," International Conference on Signal Processing, 2010, IEEE, pp. 78-81.

Cohen, Deborah, et al., "Sub-Nyquist Sampling for Power Spectrum Sensing in Cognitive Radios: A Unified Approach," IEEE Transactions on Signal Processing, vol. 62, Issue 15, 2014, pp. 3897-3910.

Ferrari, Lorenzo, et al., "Utility Maximizing Sequential Sensing Over a Finite Horizon," IEEE Transactions on Signal Processing, vol. 65, Issue 13, Jul. 2017, pp. 3430-3445.

Fudge, Gerald, et al., "A Nyquist Folding Analog-to-Information Receiver," 42nd Asilomar Conference on Signals, Systems, and Computers, IEEE, 2008, 5 pages.

Hao, Jinping, et al., "Sequential Compressive Sensing in Wireless Sensor Networks," Vehicular Technology Conference, 2012, IEEE, 5 pages.

Israeli, Etgar, et al., "Hardware Calibration of the Modulated Wideband Converter," Global Communications Conference, 2014, IEEE, pp. 948-953.

Kaspi, Yonatan, et al., "Searching for Multiple Targets with Measurement Dependent Noise," International Symposium on Information Theory, 2015, IEEE, pp. 969-973.

Lexa, Michael, et al., "Compressive and Noncompressive Power Spectral Density Estimation from Periodic Nonuniform Samples," ArXiv, Oct. 2011, 24 pages.

Lu, Yue, et al., "A Theory for Sampling Signals from a Union of Subspaces," IEEE Transactions on Signal Processing, vol. 56, Issue 6, 2008, 12 pages.

Ma, Yuan, et al., "Sparsity Independent Sub-Nyquist Rate Wideband Spectrum Sensing on Real-Time TV White Space," IEEE Transactions on Vehicular Technology, 2017, 11 pages.

Malioutov, Dmitry, et al., "Sequential Compressed Sensing," IEEE Journal of Selected Topics in Signal Processing, vol. 4, Issue 2, 2010, 9 pages.

Michelusi, Nicolo, et al., "Cross-layer estimation and control for Cognitive Radio: Exploiting Sparse Network Dynamics," IEEE Transactions on Cognitive Communications and Networking, vol. 1, Issue 1, Jun. 2015, 17 pages.

Mishali, Moshe, et al., "Blind Multiband Signal Reconstruction: Compressed Sensing for Analog Signals," IEEE Transactions on Signal Processing, vol. 57, Issue 3, Mar. 2009, pp. 993-1009.

Mishali, Moshe, et al. "From theory to practice: Sub-nyquist sampling of sparse wideband analog signals," IEEE Journal of Selected Topics in Signal Processing, Nov. 10, 2009, 17 pages.

Mishali, Moshe, et al., "Xampling: Signal Acquisition and Processing in Union of Subspaces," IEEE Transactions on Signal Processing, vol. 59, Issue 10, Oct. 2011, pp. 4719-4734.

Scarlett, Jonathan, et al., "Converse Bounds for Noisy Group Testing with Arbitrary Measurement Matrices," International Symposium on Information Theory, 2016, IEEE, 5 pages.

Sharma, Abhay, et al., "On Finding a Subset of Non-Defective Items from a Large Population Using Group Tests: Recovery Algorithms and Bounds," International Conference on Acoustics, Speech and Signal Processing, 2015, IEEE, pp. 4150-4154.

Sun, Hongjian, et al., "Wideband Spectrum Sensing with Sub-Nyquist Sampling in Cognitive Radios," IEEE Transactions on Signal Processing, vol. 60, Issue 11, Nov. 2012, pp. 6068-6073.

Tropp, Joel, et al., "Beyond Nyquist: Efficient Sampling of Sparse Bandlimited Signals," IEEE Transactions on Information Theory, vol. 56, Issue 1, Jan. 2010, pp. 520-544.

Unnikrishnan, Jayakrishnan, et al., "Algorithms for Dynamic Spectrum Access with Learning for Cognitive Radio," IEEE Transactions on Signal Processing, vol. 58, Issue 2, Feb. 2010, pp. 750-760.

Venkataramani, Raman, et al., "Perfect Reconstruction Formulas and Bounds on Aliasing Error in Sub-Nyquist Nonuniform Sampling of Multiband Signals," IEEE Transactions on Information Theory, vol. 46, Issue 6, Sep. 2000, pp. 2173-2183.

Wang, Kehao, et al., "On Optimality of Myopic Policy for Restless Multi-Armed Bandit Problem: An Axiomatic Approach," IEEE Transactions on Signal Processing, vol. 60, Issue 1, Jan. 2012, pp. 300-309.

Zhao Qing, et al., "On Myopic Sensing for Multi-channel Opportunistic Access: Structure, Optimality, and Performance," IEEE Transactions on Wireless Communications, vol. 7, Issue 12, 2008, 11 pages.

Zeinalkhani, Zeinab, et al., "Iterative Recovery Algorithms for Compressed Sensing of Wideband Block Sparse Spectrums," Cognitive Radio and Networks Symposium, 2012, IEEE, pp. 1630-1634.

Zeng, Fanzi, et al., "Distributed Compressive Spectrum Sensing in Cooperative Multihop Cognitive Networks," IEEE Journal of Selected Topics in Signal Processing, vol. 5, Issue 1, Feb. 2011, pp. 37-48.

ZHao Jie, et al., "Cooperative Sequential Compressed Spectrum Sensing over Wide Spectrum Band," International Conference on Sensing, Communication, and Networking, 2015, IEEE, pp. 1-9.

* cited by examiner

ACTIVE SEQUENTIAL XAMPLING RECEIVER FOR SPECTRUM SENSING

RELATED APPLICATIONS

This application claims the benefit of provisional patent application Ser. No. 62/619,291, filed Jan. 19, 2018, the disclosure of which is hereby incorporated herein by reference in its entirety.

FIELD OF THE DISCLOSURE

This application is related to radio frequency (RF) receivers, and specifically to spectrum sensing in RF receivers.

BACKGROUND

Mobile devices are increasingly being used for entertainment, such as gaming and video streaming. The coexistence of these new services with the Internet of Things (IoT) and machine-to-machine communications means that wireless applications may quickly become starved for bandwidth. Millimeter wave and other radio frequency (RF) spectrum can provide much needed increases in throughput but pose a challenge of high-speed sampling required to sense the spectrum. This may be a particular challenge for relatively low-rate IoT applications, which are likely to benefit from opportunistic decentralized spectrum access. To achieve efficient usage of the spectrum, sensing techniques are needed which overcome the bottleneck of sampling at the Nyquist rate, which is generally too time and/or energy intensive, particularly for low-power wireless devices.

Two classes of solutions have been proposed to overcome this bottleneck. The first approach uses a sub-Nyquist sampling front end using analog-to-digital conversion techniques named xampling architectures. Xampling architectures preprocess a signal in the analog domain and then sample at a lower rate compared with what the Nyquist theorem dictates. The aim is to reduce the complexity and energy cost for the analog-to-digital converter hardware. However, prior xampling approaches increase complexity in the reconstruction of the underlying signal, and accurate spectrum sensing may not be guaranteed in lower signal-to-noise ratio (SNR) signals.

The second approach consists in selecting opportunistically, and in a cognitive fashion, a small section of spectrum at a time, relying on an analog front end able to switch between small sub-bands. This approach may be better able to cope with lower SNR signals. However, for sensing a broad spectrum, the second approach may take too much time to determine and use available spectrum before the environment has changed.

SUMMARY

An active sequential xampling receiver for spectrum sensing is disclosed. The receiver includes a dynamically adjustable analog front end to perform sub-Nyquist energy sensing across a broad radio frequency (RF) spectrum. In an exemplary aspect, the receiver includes a dynamic modulator which modulates the broad RF spectrum to dynamically select sub-bands (e.g., RF channels) and fold their spectral content into a narrower baseband signal for energy detection. A controller adjusts the dynamic modulator to maximize utility of the spectrum detection based on past energy observations.

Nyquist sampling at very high carriers can be prohibitively costly for low-power wireless devices. In spectrum sensing, this limit calls for the receiver to include an analog front end that can sweep different bands quickly in order to use the available spectrum opportunistically. Thus, the sensing action of the analog front end maximizes a utility function decreasing linearly with the number of measurements and increasing as a function of the active spectrum components that are correctly detected. The optimization selects the best linear combinations of sub-bands to mix in order to accrue maximum utility. The structure of the utility represents the trade-off between exploration, exploitation, and risk of making an error that is characteristic of the spectrum-sensing problem.

An exemplary embodiment relates to an RF receiver. The RF receiver includes a dynamic modulator configured to modulate a received signal such that one or more portions of the received signal are dynamically selected and folded into a baseband of a modulated signal. The RF receiver also includes an energy detector configured to sample an energy of the modulated signal at a sub-Nyquist rate. The RF receiver also includes a controller configured to adjust the dynamic modulator based on an output of the energy detector.

Another exemplary embodiment relates to a method for sensing occupied RF spectrum. The method includes receiving an RF signal and sequentially modulating the RF signal using a sensing matrix to produce a set of modulated signals. The method also includes detecting a signal occupancy for each of the set of modulated signals. In addition, coefficients of the sensing matrix are dynamically adjusted based on detecting the signal occupancy.

Another exemplary embodiment relates to an analog front end for an RF receiver. The analog front end includes a dynamic modulator configured to convert an incoming RF signal having a first bandwidth to a modulated signal having content of the first bandwidth dynamically folded in a second bandwidth narrower than the first bandwidth. The analog front end also includes an energy detector configured to sense signal energy of the modulated signal within the second RF bandwidth.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
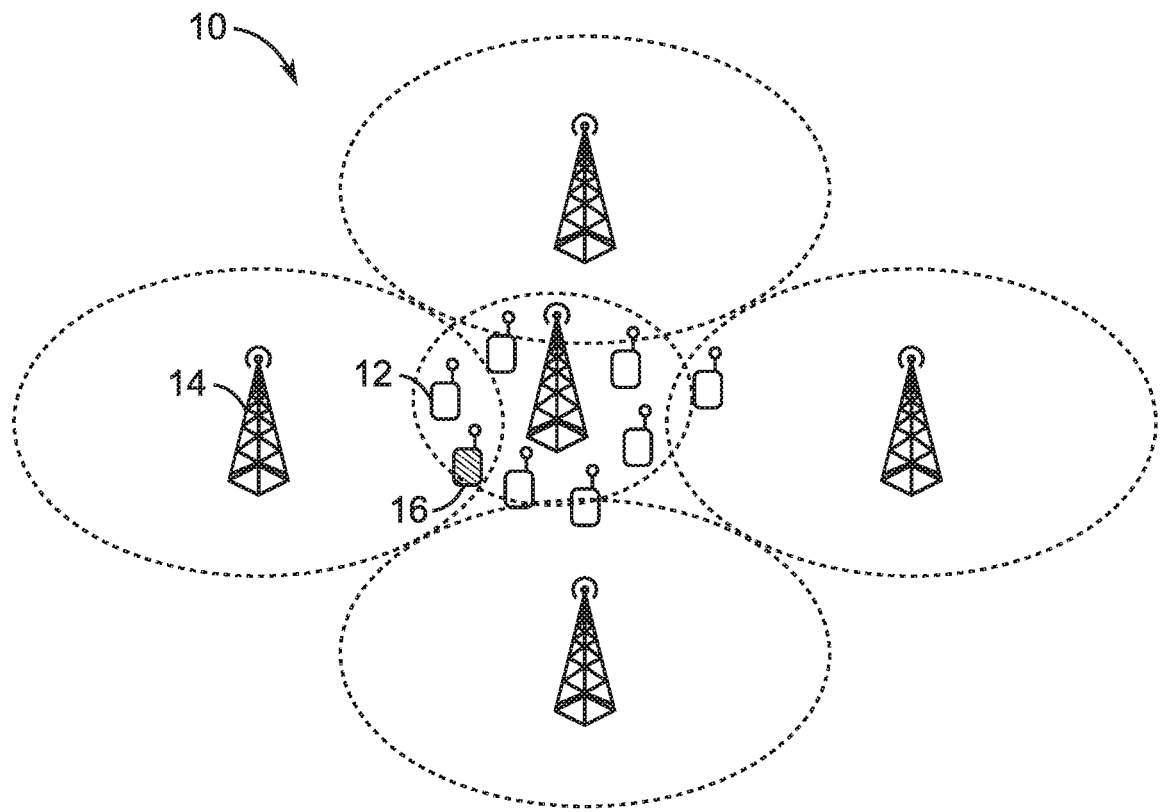
FIG. 1A is a schematic diagram of a cognitive radio scenario.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

An active sequential xampling receiver for spectrum sensing is disclosed. The receiver includes a dynamically adjustable analog front end to perform sub-Nyquist energy sensing across a broad radio frequency (RF) spectrum. In an exemplary aspect, the receiver includes a dynamic modulator which modulates the broad RF spectrum to dynamically select sub-bands (e.g., RF channels) and fold their spectral content into a narrower baseband signal for energy detection. A controller adjusts the dynamic modulator to maximize utility of the spectrum detection based on past energy observations.

Nyquist sampling at very high carriers can be prohibitively costly for low-power wireless devices. In spectrum sensing, this limit calls for the receiver to include an analog front end that can sweep different bands quickly in order to use the available spectrum opportunistically. Thus, the sensing action of the analog front end maximizes a utility function decreasing linearly with the number of measurements and increasing as a function of the active spectrum components that are correctly detected. The optimization selects the best linear combinations of sub-bands to mix in order to accrue maximum utility. The structure of the utility represents the trade-off between exploration, exploitation, and risk of making an error that is characteristic of the spectrum-sensing problem.

Compared with other multi-band signals receivers, the hardware in the architecture according to the present disclosure is simpler, since the architecture uses a single non-coherent receiver and a single sampling device that collects energy measurements sequentially, sampling at a fraction of the Nyquist rate. A time-dependent utility function is used to optimize the trade-off between sensing and exploitation.

It is important to remark that the optimum action generally does not attempt the full recovery of all the white spaces. The optimum decision may be conservative and sense a very limited portion of the spectrum. Furthermore, since scanning one sub-band at a time is a possible action of the active spectrum-sensing strategy, the method of the present disclosure subsumes previous techniques to scan the spectrum optimally, without mixing it. This approach is referred to as direct inspection and is discussed in Section III, A.

The present disclosure is more closely related to the stochastic optimization schemes that extend the framework and optimize a compressive spectrum-sensing action based on previous observations. The common goal of stochastic optimization schemes is the recovery of the full support of a given vector. Typically, such techniques are shown to be able to cope with lower signal-to-noise ratio (SNR) in the signal reconstruction with low complexity. What these stochastic optimization schemes do not capture is that, in cognitive spectrum-sensing applications, a timely decision is also desirable to have enough time to exploit the spectrum. The method of the present disclosure is also adaptive with respect to the time horizon K, the number of resources N, the prior probabilities on the states of each resources, and the parameters that characterize the utility function, that is, reward and penalty for good/bad decisions.

Based on performance analysis, it is the clear that sparse and adaptive sensing matrix designs outperform dense sensing matrices and those that are sparse but static. There are two main reasons for this: (1) through belief propagation algorithms, they achieve near-optimum detection performance, and (2) they mitigate the aforementioned noise-folding phenomena. The method of the present disclosure is applicable not only when the utility comes from finding empty entries (e.g., spectrum sensing) but also when one is interested in finding the occupied ones (e.g., in a RADAR application).

More specifically, the present disclosure is organized as follows: Section I is dedicated to the signal model and the analog front end of the detector according to the present disclosure, and Section II formulates the optimization problem. Then, Section III addresses the optimal dynamic design for the direct inspection case (III, A), in which there is no mixing of sub-bands (also known as scanning receiver), and a group testing case (III, B) in which is introduced the possibility of mixing different bands. Section IV is dedicated to additional discussions: an alternative standard method for detection based on maximum likelihood estimate and LASSO relaxation, hardware limitations of the architecture according to the present disclosure, and the extension of the framework according to the present disclosure to other applications. The present disclosure demonstrates that, even if finding the optimal policy is exponentially complex in the number of resources, the approximation factor for a greedy procedure can be characterized. Numerical results to sustain the claims of the present disclosure are presented in Section V.

Regarding notation, bold lowercase represents vectors, bold uppercase represent matrices, and calligraphic letters indicate sets. For example, $s_\mathcal{A}$ indicates the entries $i \in \mathcal{A}$ of vector s, and $\|y\|_A^2$ represents the weighted $\ell_2$-norm $y^T A y$. For any set function $f(\mathcal{A})$, the marginal increment for adding element a is defined as $\partial_a f(\mathcal{A}) = f(\mathcal{A} + a) - f(\mathcal{A})$.

I. Signal Model and Receiver Overview

A. Cognitive Radio Scenario

FIG. 1A is a schematic diagram of a cognitive radio scenario 10. The cognitive radio scenario 10 includes a number of RF devices, which may include one or more user equipment (UE) 12, base stations 14, and similar devices. Each of the UEs 12 and base stations 14 may send and/or receive signals over a common RF spectrum. Accordingly, a receiver 16 in the cognitive radio scenario 10 may need to quickly and accurately sense which portions of the RF spectrum are occupied in order to receive and/or transmit signals within the RF spectrum as needed.

Figure 1B:
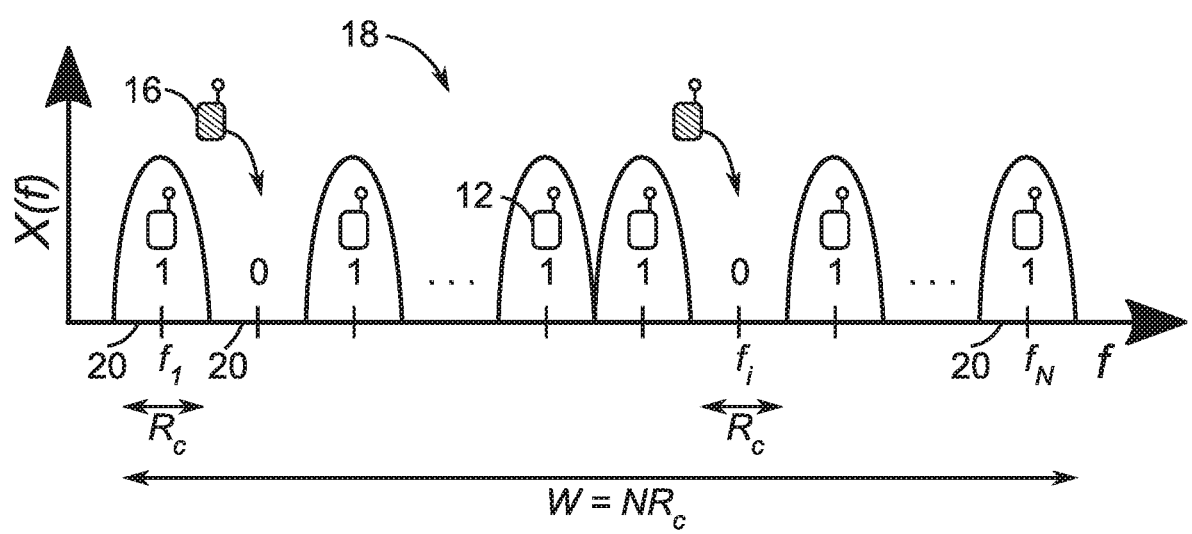
FIG. 1B is a graphical representation of a radio-frequency (RF) spectrum of the cognitive radio scenario of FIG. 1A.

FIG. 1B is a graphical representation of an RF spectrum 18 of the cognitive radio scenario 10 of FIG. 1A. The RF spectrum 18 may be spectrum with opportunistic access, such as millimeter wave (60-80 GHz), citizens broadband radio service (CBRS), or other frequencies. The RF spectrum 18 being sensed by the receiver 16 can be represented in the frequency domain as $X(f)$ and in the time domain as $x(t)$. In addition, there may be N channels 20 (e.g., sub-bands centered at frequencies $f_1, f_2, \ldots, f_i, \ldots, f_N$) of the RF spectrum 18, each channel 20 having a channel width $R_c$ such that the RF spectrum 18 has a bandwidth of $W = NR_c$.

In the context of cognitive radio for the RF spectrum 18, each transmission includes large amounts of control signals overhead in addition to the payload. Therefore, it can be assumed that the activity of the UEs 12 and base stations 14 over one or more channels 20 will persist for several sampling periods $T_s$. However, assuming this interval T lasts for a multiple K of the sampling period $T_s$ (i.e., $T = KT_s$), the sensing mechanism of the receiver 16 should provide the fastest decision it can. The goal of the receiver 16 according to the present disclosure is to sequentially sense the spectrum for a first portion of this interval T and transmit the most it can during the remaining time over the channels 20 found empty (or, alternatively, process one or more occupied channels 20).

B. Spectrum Sensing Architecture

Figure 2:
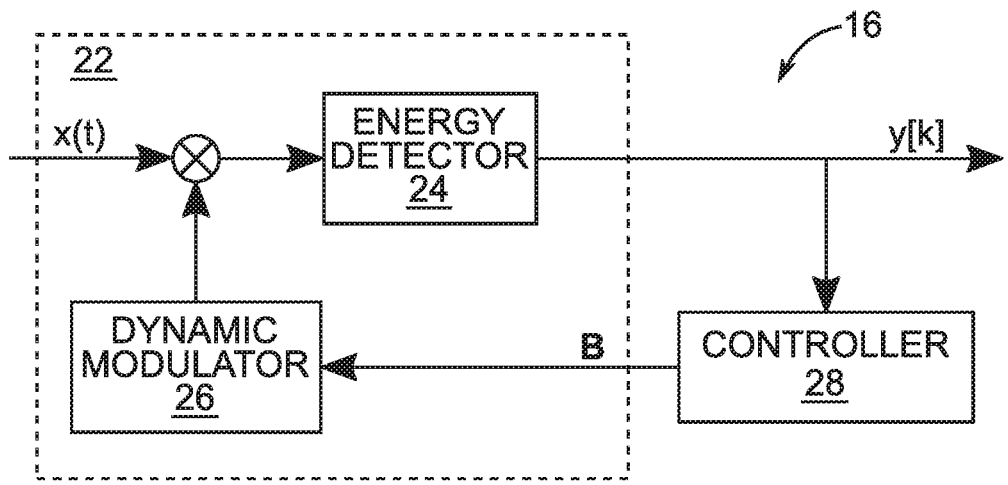
FIG. 2 is a diagram of an exemplary receiver configured to sense spectrum at a sub-Nyquist rate by dynamically modulating portions of a broad spectrum.

FIG. 2 is a diagram of an exemplary receiver 16 configured to sense spectrum at a sub-Nyquist rate by dynamically modulating portions of a broad spectrum. The receiver 16 includes an analog front end 22, which includes an energy detector 24 and a dynamic modulator 26. The energy detector 24 is configured to sample energy of an input signal at a sub-Nyquist rate. In an exemplary aspect, the energy detector 24 is a single-channel detector which can operate quickly with low power demands by filtering and sampling a single channel baseband input signal.

The dynamic modulator 26 facilitates use of the single channel energy detector 24 by modulating a received signal $x(t)$ (e.g., the RF spectrum 18) such that portions (e.g., sub-bands or channels 20) of the received signal $x(t)$ are dynamically selected and folded into the single channel baseband input signal of the energy detector 24. The portions of the received signal $x(t)$ which are selected and folded into the baseband input signal by the dynamic modulator 26 are selected by a controller 28 in order to maximize utility of the spectrum sensing function as described further below in Sections II and III. The controller 28 can control the dynamic modulator 26 through a sensing matrix B or other control signals.

The receiver 16 can thus perform carrier sensing over multiple bands simultaneously. The receiver 16 has the advantage of being sequential, and not requiring time accurate time offset between sampling channel as in some approaches. In addition, the spectrum sensing function of the receiver 16 is robust to the noise-folding problem, in which SNR deteriorates approximately linear in the number of bands that are aliased prior to sampling.

Figure 3:
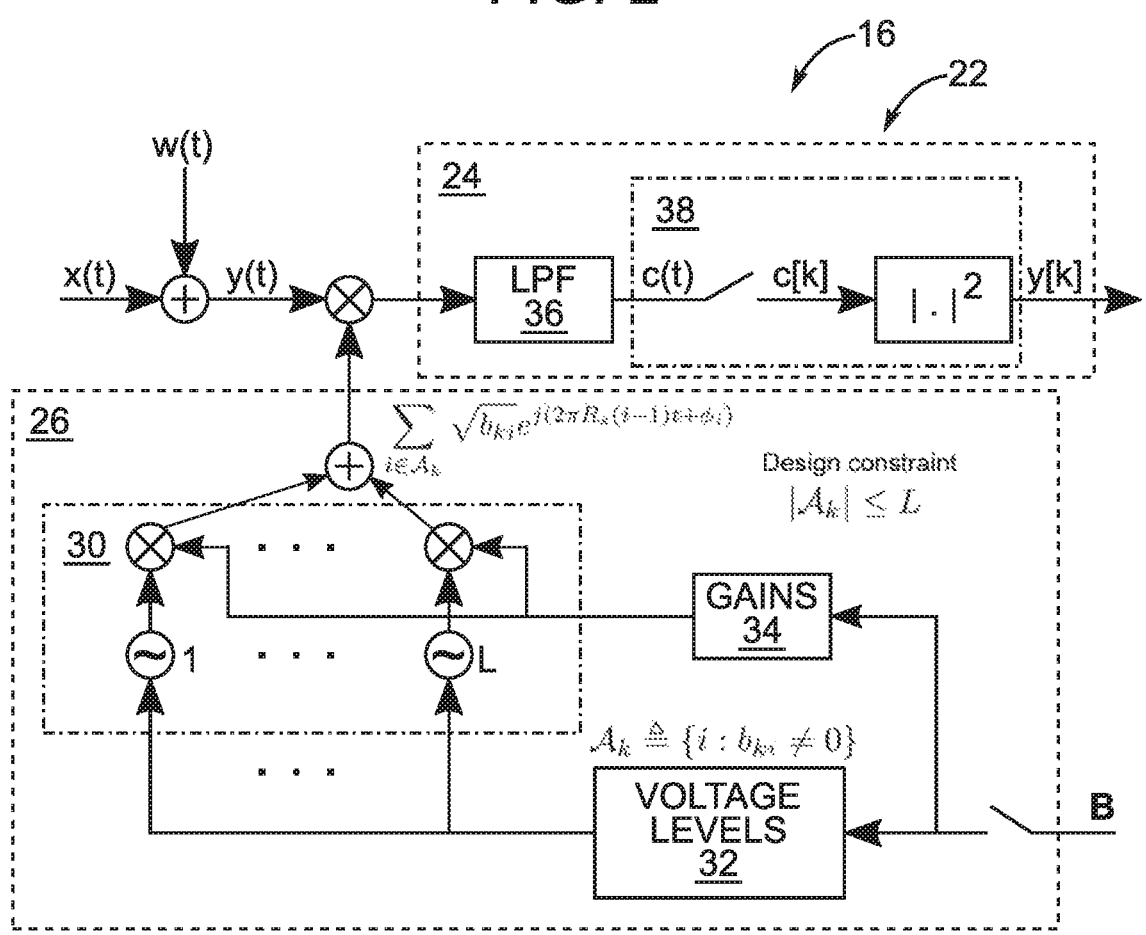
FIG. 3 is a diagram of the exemplary receiver of FIG. 2, illustrating in greater detail components of an analog front end.

FIG. 3 is a diagram of the exemplary receiver 16 of FIG. 2, illustrating in greater detail components of the analog front end 22. In the proposed analog front end 22, the dynamic modulator 26 folds the spectrum present in specific sub-bands onto the center frequency of the energy detector 24 for filtering and sampling, during what can be referred to as a sub-Nyquist carrier sensing phase. The samples are spaced by intervals of duration $$T_S = \frac{1}{R_s}$$

which is a factor 1/N smaller than the total spectrum. As the diagram in FIG. 3 shows, rather than having a filter bank architecture, the analog front end 22 performs sequential non-coherent tests. These tests are designed according to a utility-maximizing strategy, such as with the sensing matrix B chosen by the controller 28 of FIG. 2 via a greedy algorithm, and the tests' thresholds y (described further below in Sections II and III). It is assumed that the complex envelope of the analog signal we are exploring is a multi-component signal, whose components are a frequency band width equal to $W = NR_s$. During the interval $0 \le t < T$ the received signal is:

$$y(t) = x(t) + w(t) \qquad \text{EQ. 1}$$

$$x(t) = \sum_{i=1}^{N} s_i x_i(t) e^{-j2\pi R_s (i-1)t} \qquad \text{EQ. 2}$$

with $W(t) \sim \mathcal{N}(0, N_0 \delta(\tau))$ being additive white Gaussian noise. The components of the received signals $x_i(t)$ correspond to each primary user source, modeled as band-limited random processes with bandwidth $R_s$; they are equal in the mean square sense to the following process:

$$x_i(t) = \sum_{k=1}^{N} x_i[k] \mathrm{sinc}(\pi(R_s t - k + 1)). \quad \text{EQ. 3}$$

The dynamic modulator 26 modulates the received signal y(t) over the period $(k-1)T_s \leq t < kT_s$ with:

$$\beta_k(t) = \sum_{i=1}^{N} \sqrt{b_{ki}} e^{j(2\pi R_s(i-1)t + \phi_i)}. \quad \text{EQ. 4}$$

to produce a modulated signal, where $b_{ki}$ are the coefficients of the sensing matrix B and the phase $\phi_i$ accounts for the delay in generating the tone at the ith frequency plus the oscillator phase. In this regard, the dynamic modulator 26 can be implemented with a set of L voltage controlled oscillators (VCOs) 30. The sensing matrix B can therefore control a voltage level generation network 32 for the inputs to the VCOs 30 (and/or gains 34). The VCOs 30 are not required to be synchronized or phase-locked. Furthermore, the switching frequency of the VCOs 30 may also be $R_s$ (i.e., the single channel bandwidth).

The energy detector 24 receives and samples an energy of the modulated signal. In an exemplary aspect, the energy detector 24 includes a low-pass filter (LPF) 36, which is convolved with the modulated signal. The LPF 36 may have an impulse response $\mathrm{sinc}(\pi R_s t)$ and outputs the filtered modulated signal c(t). The energy detector 24 also includes a sampling circuit 38, which then samples the filtered modulated signal c(t) at times $kT_s$; $k=1, \ldots, \kappa$ in the single-channel baseband. This operation can be considered equivalent to an orthogonal projection, as shown below:

$$c[k] = [y(t)\beta_k(t)] * R_s \mathrm{sinc}(\pi R_s t)|_{t=kT_s} = \sum_{i=1}^{N} \sqrt{b_{ki}} e^{j\phi_i} Y_{ki} \quad \text{EQ. 5}$$

where $Y_{ki}$ represents the orthogonal projections over the period $(k-1)T_s \leq t < kT_s$ of y(t) over the following signals:

$$Y_{ki} = \langle y(t), R_s e^{j2\pi R_s(i-1)t} \mathrm{sinc}(\pi(R_s t - k + 1)) \rangle. \quad \text{EQ. 6}$$

If the periodic signals were not truncated in time, the relationship would be exact; in practice, however, there are some approximation errors due to the windowing of the signal over the prescribed interval $[(k-1)T_s, kT_s]$. The effect of this can be mitigated by using raised cosine filtering and a non-rectangular window to reduce the effect of side lobes. Considering that the signals $$\{e^{j2\pi R_s(i-1)t} \mathrm{sinc}(\pi(R_s t - k + 1))\}_{i,k \in Z}$$

form an orthogonal basis, and that Equation 1 is equivalent to the following:

$$x(t) = \sum_{k=1}^{K} \sum_{i=1}^{N} s_i x_i[k] e^{j2\pi R_s(i-1)t} \mathrm{sinc}(\pi(R_s t - k + 1)) \quad \text{EQ. 7}$$

$$Y_{ki} = s_i x_i[k] + w_i[k] \quad \text{EQ. 8}$$

where $w_i[k] \sim C\mathcal{N}(0; n_i)$. If $x_i[k]$ is also modelled as i.i.d. $x_i[k] \sim C\mathcal{N}(0; \varphi_i)$, then for a given state s:

$$Y_{ki} \sim C\mathcal{N}(0, \varphi_i + N_0), \quad \text{EQ. 9}$$

where $\varphi$ is a vector collecting the average, unknown a priori, received signal power from the existing communications. The energy detector 24 samples for $k=1, \ldots, \kappa$ are as follows:

$$c[k] = \sum_{i=1}^{N} \sqrt{b_{ki}} e^{j\phi_i} (s_i x_i[k] + w_i[k]) \quad \text{EQ. 10}$$

and therefore (assuming $\phi_i$'s are independent and uniformly distributed in $[0, 2\pi)$) they are also conditionally zero mean Gaussian random variables:

$$c[k] \sim C\mathcal{N}(0, \theta[k]), \quad \text{EQ. 11}$$

$$\theta[k] = \theta(b_k, s) \triangleq b_k^T(\varphi + n) \quad \text{EQ. 12}$$

It follows that, with reference to FIGS. 1A and 1B, the information for the detection of communications by the UEs 12 and/or base stations 14 is embedded in the variance of the sample, which is the energy received during the kth period. Sufficient statistics for the problem are as follows:

$$y[k] \triangleq |c[k]|^2 \quad \text{EQ 13}$$

which are exponentially distributed, that is, $y[k] \sim \mathrm{Exp}(\theta[k])$.

C. Hardware Considerations

The circuit diagram of FIG. 3 assumes a settling time for the VCOs 30 much smaller than $T_s$ (e.g., the sampling period for the single channel sub-band). If this assumption does not hold, one should use a low-pass filter with a smaller bandwidth and collect the samples c[k] at an even slower rate than $R_s$ to wait for the VCOs to settle. This modification does not alter the statistical characterization of the samples, derived in subsection I.B above. The drawback of taking samples less often is that (assuming the same occupancy coherence time) one has accrued less information than what is available in the received signal and has less than K slots to decide. Given that the strategy is derived as a function of K, this does not invalidate the findings. Another possibility is to replace the L tunable VCOs 30 with N oscillators at constant frequencies, corresponding to the N possible bands of the signal. Using N oscillators increases the power consumption and cost of the circuit but significantly reduces the switching time between two measurements. Hence, this is the natural choice if one wants to exploit a dense sensing matrix. Instead, the use of a set of VCOs 30 is preferable if the matrices are sparse because a small number of VCOs can synthesize the mixing signal. The switching is performed by a multiplexer that takes the sum of the up to L tones selected by the vector $b_k$.

In general, since the detection of the signal is the focus, with reasonably good device components, calibration can be expected to be either far less demanding or unnecessary, if one accepts loss in sensitivity. The binary coefficients for the vector b can be set to ones and zeros, as discussed in Section III, B. Controlling the gains 34 is unnecessary for the system to work, and it may be preferable not to add tunable gains 34 because they can be another possible source of uncertainty and complexity in the system. Finally, imperfect tuning of the VCOs 30 reduces the SNR, either by spreading or misplacing the center frequency of the components of interest, but not fundamentally impairing its detection.

II. Optimization Framework

With reference to FIGS. 1A-3, the receiver 16 can be modeled as needing to divide K instants of time available between the sensing and the exploitation of a set $\mathcal{N} = \{1; 2, \ldots, N\}$ of sub-bands (e.g., channels 20 of the RF spectrum 18). A utility function of the receiver 16 accrues a reward that is a function of the underlying state vector for these items:

$$s \triangleq [s_1, \ldots, s_N] \in \{0,1\}^N \qquad \text{EQ. 14}$$

where the entries $s_i \in \{0,1\}$, as well as the residual time available after sensing. The state variables $s_i$ are indicators of good/bad (0=1) state of a resource; for the cognitive spectrum sensing application 0 would mean the channel is "idle" and 1 would mean the channel is "busy". The receiver 16 acquires information about the entries via random observations coming from a known probability density function parameterized by an unknown vector.

During the times devoted to sensing $k=1, 2, \ldots, \kappa < K$ the receiver 16 can dynamically and adaptively design each measurement by selecting a subset of entries of s to probe through a sensing vector $b_k=[b_{k1}, b_{k2}, \ldots, b_{kN}]$. The $b_{ki}$'s will be non-zero only on the channels that are actively sensed; it is assumed the measurement provides an observation $y[k]$ drawn from a density $f_{\theta[k]}(y)$ that is a function of both the choice of $b_k$ and the state s, i.e. $\theta[k]=\theta(b_k, s)$. It is assumed the state variables $s_i$ are mutually independent Bernoulli random variables with known prior probabilities given by a vector $\omega=[\omega_1, \omega_2, \ldots, \omega_N]$ where $\omega_i=P(s_i=0)$. As described further in Section III below, the receiver can be designed with:

1) the $\kappa \times N$ measurement matrix B (exploration phase)
2) a set of N decision rules $\delta=\{\delta_i \in \{0,1\}: i=1, 2, \ldots, N\}$ over the unknown states $s_i$ of the resources (at the end of the exploration phase).

Notice that the design of B includes:
- the measurement vectors $b_k$ for each test at time $k=1, 2, \ldots, \kappa$ (matrix rows),
- the sensing (exploration) time $\kappa$ to acquire information on the states $s_i$ via the observations $y[k]$ (number of rows).

The total utility for the receiver 16 will be proportional to the time left for exploitation (K−k). A reward $r_i > 0$ can be used for correctly detecting an empty/busy resource and a penalty $p_i < 0$ for failing to detect a busy/empty resource. The utility of the detection function can be written as:

$$U(s, \mathcal{N}, K, B, \delta) \triangleq \begin{cases} (K-k)\sum_{i=1}^{N} \omega_i r_i(1-\alpha_i) + (1-\omega_i)p_i\beta_i & \text{case 0} \\ (K-k)\sum_{i=1}^{N} (1-\omega_i)(1-\beta_i)r_i + \omega_i \alpha_i p_i & \text{case 1} \end{cases} \qquad \text{EQ. 15}$$

where $\alpha_i$; $\beta_i$ denote the type I and type II errors probability respectively (e.g., $\alpha_i=P(\delta_i=1|s_i=0)$ and $\beta_i=P(\delta_i=0|s_i=1)$).

To differentiate between case 0 and case 1 allows to consider applications where the utility comes from an action on the entries detected as empty/busy: e.g., in a spectrum sensing application, the utility would come from the decision on transmitting over frequency bands found empty, whereas for a RADAR application, it makes more sense to consider the utility comes from taking action on the frequency (spatial directions) found busy. Finding the optimal policy corresponds to solving the following optimization problem:

$$\max_{B,\delta} \mathbb{E}[U(s, \mathcal{N}, K, B, \delta)] \qquad \text{EQ. 16}$$

This approach can be modified to fit different observation models and assumptions, but as an example this disclosure considers the following form for the function $\theta$:

$$\theta[k]=\theta(b_k,s)=b_k(\varphi^T+w^T) \qquad \text{EQ. 17}$$

where $\varphi=[\varphi_1, \varphi_2, \ldots, \varphi_N]$ is a non-negative vector, such that the state variable $s_i=1$ when $\varphi_i>0$ and 0 when $\varphi_i=0$. The vector $w=[w_1, w_2, \ldots, w_N]$ models a generic additive system noise. An exemplary aspect of this disclosure concerns the detection of the non-negative entries of $\varphi$ and consequently the maximization of the utility accruable from the resources declared to be in the empty/busy state (Equation 15). The observation model also assumes that $f_{\theta[k]}(y)=\text{Exp}(\theta[k])$, i.e.:

$$y[k] \sim f_{\theta[k]}(y) = \frac{1}{\theta[k]} e^{-\frac{y}{\theta[k]}} \qquad \text{EQ. 18}$$

where, for convenience, the alternative parameterization for the exponential distribution is generally used herein. In the context of RF spectrum sensing, this choice of distribution models the energy of complex circularly symmetric signal samples in each sub-band with zero mean and variance $\varphi_i$ embedded in additive white Gaussian noise with variance $w_1$.

III. Dynamic Design of Sensing Matrices

A. Direct Inspection Case

In the direct inspection (DI) case, $b_k$ is limited to only one non-zero entry i, that is, $b_{ki} \neq 0$, $b_{kj}=0$ $\forall j \neq i$. This means that there is an underlying hypothesis testing:

$$\mathcal{H}_0: y[k] \sim \text{Exp}(\theta_0[k])$$

$$\mathcal{H}_1: y[k] \sim \text{Exp}(\theta[k])$$

with $\theta_0[k]=b_{ki}n_i$ and $\theta[k]=b_{ki}(\varphi_i+n_i)>\theta_0[k]$. In this context, it is known that the signal energy is a sufficient statistic for the test and the energy detection is optimal. Assuming no prior knowledge over the $\varphi_i$'s in case of existing communication, to set the test threshold alone is needed, which is set in order to maximize the utility defined in Equation 15. Defining $\theta^*[k]=\max\{y[k], b_{ki}(\varphi_{min}+\omega_i)\}$ obtains the following:

$$y[k] \underset{H_0}{\overset{H_1}{\gtrless}} \frac{\ln\left(\gamma_i \frac{\theta*[k]}{\theta_0}\right)}{\frac{1}{\theta_0} - \frac{1}{\theta*[k]}} \qquad \text{EQ. 19}$$

$$\gamma_i \triangleq \begin{cases} \frac{r_i \omega_i}{|\rho_i|(1-\omega_i)} & \text{case 0} \\ \frac{|\rho_i|\omega_i}{r_i(1-\omega_i)} & \text{case 1} \end{cases} \qquad \text{EQ. 20}$$

Notice that, assuming a minimum average received signal power of $\varphi_{min}>0$ in the case of existing transmission, this makes the test meaningful also for values of $\gamma_i<1$.

Assumption 1:

To simplify the decision problem, every resource is assumed to be sensed before being declared empty/busy. This can be enforced as a standard/protocol rule or numerically guaranteed by setting $\forall i \in \mathcal{N}$, $$\omega_i < \frac{\rho_i}{\rho_i + r_i} \text{ (case 0)} / \omega_i > \frac{r_i}{|\rho_i| + r_i} \text{ (case 1)}.$$

It is clear that the optimality of the test completely characterizes the set of decision rules $\delta$ for the sensed resources, while Assumption 1 gives the decision rule for the non-sensed resources. This implies that for the DI case, the optimization in Equation 16 can be expressed solely in terms of B. It is also known that for this type of text, where there is uncertainty in a parameter of the alternative hypothesis, one does not know the exact miss probability β, thus an upper-bound is used, which reflects in a lower bound for the achievable utility. Since this test is part of the DI strategy, the superscript $^{DI}$ is added to the test error probabilities $\alpha_i$ and $\beta_i$ as follows:

$$\alpha_i^{DI} = \min\left\{\left(\frac{|\rho_i|(1-\omega_i)}{r_i\omega_i\left(1+\frac{\varphi\min}{n_i}\right)}\right)^{\frac{1+\frac{\varphi\min}{n_i}}{\frac{\varphi\min}{n_i}}}, 1\right\} \qquad \text{EQ. 21}$$

$$\beta_i^{DI} = 1 - (\alpha_i^{DI})^{\frac{1}{1+\frac{\varphi_i}{n_i}}}. \qquad \text{EQ. 22}$$

The above shows that the false alarm probability is independent from the alternative hypothesis, whereas the detection improves with the true average transmitted power $\varphi_i$. What can be guaranteed, since $\varphi_i \geq \varphi_{min}$, is that $$\beta_i^{DI} \leq 1 - \left(\frac{\rho_i(1-\omega_i)}{r_i\omega_i\left(1+\frac{\varphi_{min}}{n_i}\right)}\right)^{\frac{n_i}{\varphi\min}} = \beta_{i,max}^{DI} \qquad \text{EQ. 23}$$

The threshold in Equation 20 is the optimal threshold that minimizes the Bayesian risk (maximizes the utility) for the binary case, when $\omega_i$ is known. It is common practice to replace the maximum likelihood estimate for the unknown $\omega_i$ (Generalized Likelihood Ratio Test (GLRT)) and then reduce to the binary case using the same threshold. A local, more powerful test exists for $\theta \to \theta_0$, but GLRT is preferred for its high SNR range.

Note that the test performance for the DI case does not depend on $b_{ki}$; therefore, for the DI case no further optimization is needed over the sensing matrix B other than selecting the non-zero entries.

Under Assumption 1, the optimization problem in Equation 16 can be rewritten for the DI case as follows:

$$\underset{\mathcal{A} \subseteq \mathcal{N}}{\text{maximize}}\, U^{DI}(\mathcal{A}) \qquad \text{EQ. 24}$$

$$U^{DI}(\mathcal{A}) \triangleq (K - |\mathcal{A}|) \sum_{i \in \mathcal{A}} u_i^{DI} \qquad \text{EQ. 25}$$

$$u_i^{DI} \triangleq \omega_i r_i (1 - \alpha_i^{DI}) - (1 - \omega_i)\rho_i \beta_{i,max}^{DI} \qquad \text{EQ. 26}$$

The following lemma is then introduced:
Lemma 1:
$U^{DI}(\mathcal{A})$ is a normalized, non-monotone, non-negative sub-modular function of $\mathcal{A}$.

Lemma 1 implies that there are diminishing returns in augmenting sets by adding a certain action to bigger and bigger sets. The maximization of a non-monotonic sub-modular function is generally NP-hard, but the case of interest is not as difficult. By sorting the resources i so that $$u_1^{DI} \geq u_2^{DI} \geq \ldots \geq u_N^{DI} \qquad \text{EQ. 27}$$

the set of size i, $\mathcal{A}_i = \{1, \ldots, i\}$ will be such that for any set X of size $|X| = i$, so that $$\sum_{k=1}^{i} u_k^{DI} \geq \sum_{k \in X} u_k^{DI}.$$

Therefore, what remains is to find the best set size i such that $$U^{DI}(\mathcal{A}) \leq U^{DI}(\mathcal{A}_i) \leq_i^{max}\left((K-i)\sum_{k=1}^{i} u_k^{DI}\right) \qquad \text{EQ. 28}$$

The maximum in Equation 28 is attained for the following:

$$i^* = {}_i^{inf}\{i: \partial_{i+1} U^{DI}(\mathcal{A}_i) < 0\} \qquad \text{EQ. 29}$$

where $$\partial_{i+1} U^{DI}(\mathcal{A}_i) = (K-i)u_{i+1}^{DI} - \Sigma_{k=1}^{i+1} u_k^{DI}.$$

Given that the function is sub-modular, as soon as this condition is attained, it is maintained for i+2, i+3, and so on, given that the marginal returns continue to decrease. This maximization is greedy and stops when the marginal reward becomes negative.

B. Group Testing Approach

The test is now allowed to mix different sub-bands, that is, the vector $b_k$ to have more than one non-zero entry. The main idea of this section is to develop a dynamic simple strategy that can be characterized in closed form, and gives a sufficient condition to claim a group testing (GT) strategy would outperform the DI alternative. From the sensing matrix B, the sets $\mathcal{A}_k = \{i \in \mathcal{N}: b_{ki} \neq 0\}$ and $\mathcal{B}_i = \{1 \leq k \leq \kappa: b_{ki} \neq 0\}$ can be defined. The convention is used that, whenever $b_k$ is the argument of a function, then the set $\mathcal{A}_k$ is also the argument of that function. Similarly, when B is the argument of a function, then all the sets $\mathcal{A}_k$ for $\kappa \leq k \leq \kappa-1$ and all the sets $\mathcal{B}_i$ for $i \in \mathcal{N}$ are arguments of that function as well.

As outlined previously, aliasing of the spectrum comes with an associated noise-folding phenomenon. The effect is particularly severe in a non-coherent scheme such as that of the present disclosure. The samples are collected sequentially and not in parallel, which means that there are no multiple observations of the same value but only sequential observations tied to the same underlying random process.

To mitigate the noise-folding effects and reduce the hardware complexity, the method of the present disclosure focuses on low-density measurement matrices. The goal is to develop a relatively simple dynamic strategy for choosing a sensing matrix the utility of which can be expressed in closed form and that outperforms the DI alternative. A common approach for recovery with low-density measurement matrices is to use belief propagation via message passing, the most well-known application of which is low-density parity check (LDPC) optimum error correction decoding.

For LDPC (and compressive sensing methods), performance guarantees come as asymptotic bounds on the $\ell_2$-norm, but little is known for optimal design in the finite regime. A difficulty in the design arises from the inherent multi-hypothesis testing problem associated with sensing several resources at the same time. This is why, to develop the dynamic design according to the present disclosure, a GT approach allows consideration of a binary hypothesis test for each measurement. In this way, the complexity of the analysis is relatively low, and the expected performance for any sensing matrix can be derived under mild assumptions. In the model of the present disclosure, an uninformative prior can be assigned to the $\varphi_i$'s to run the belief propagation message-passing algorithm on the obtained measurements. Prior to providing more details, a remark regarding related GT approaches is in order.

Note that in the context of GT, little is known in presence of measurement errors that depend on the group size, which is the scenario the present disclosure considers. In the model of the present disclosure, the false alarm and misdetection probabilities depend on the optimization of the test threshold; therefore, the noise is not independently added, nor can an independent dilution be considered. Furthermore, the strategy derived depends on the finite horizon for K; that is, the results are not asymptotic.

For each test a binary group test is defined as follows:

$$\begin{cases} \mathcal{H}_0: & \forall i \in \mathcal{A}_k \quad s_i = 0 \\ & \Rightarrow \theta_0[k] = b_k^T n \\ \mathcal{H}_1: & \exists i \in \mathcal{A}_k \text{ s.t. } s_i = 1 \\ & \Rightarrow \theta[k] \geq (_i^{min} b_{ki}) \varphi_{min} + b_k^T n = \theta_{min}[k] \end{cases} \quad \text{EQ. 30}$$

Such a test is envisioned to be useful for a downlink transmission in which the access point may want to allow multiple communications at the same time and can alert the signal units over a narrowband signaling channel to access the spectrum.

It is important to highlight that the two hypotheses pertain exclusively to the group of sub-bands explored in test, that is, $\mathcal{A}_k$, not the whole spectrum. Also note that this GT approach pertains to the design of the sensing matrix and detection algorithm and not to the underlying observation model. The different approaches against which the method of the present disclosure is compared subsequently use detection strategies that are multi-hypothesis tests.

The test can be written as follows:

$$\frac{\max_{\theta[k] \geq \theta_{min}[k]} f_{\theta[k]}(y[k])}{f_{\theta_0[k]}(y[k])} \overset{H_1}{\underset{H_0}{\lessgtr}} \gamma_k \quad \text{EQ. 31}$$

for which the following can be derived:

$$\alpha(b_k, \gamma_k) = \left(\frac{1}{\gamma_k \frac{\theta_{min}}{\theta_0}}\right)^{\frac{\theta_{min}}{\theta_0} - 1} \quad \text{EQ. 32}$$

$$\beta(b_k, \gamma_k) = 1 - (\alpha(b_k, \gamma_k))^{\frac{\theta_0}{\theta_{min}}} \quad \text{EQ. 33}$$

The decision declares that resource i is busy ($\mathcal{H}_1$ is true) if the majority of the tests where resource i is involved is positive, else it accepts the null hypothesis $\mathcal{H}_0$ for resource i. Thus:

$$\pi_0(i, b, \gamma) = \left(1 - \prod_{j \in A_k \setminus i} \omega_j\right)(1 - \beta_i(b, \gamma; 0)) + \alpha(b, \gamma) \prod_{j \in A_k \setminus i} \omega_i \quad \text{EQ. 34}$$

$$\pi_i(i, b, \gamma) = 1 = \beta_i(b, \gamma; 1) \quad \text{EQ. 35}$$

where the functions $\pi_t(i, b, \gamma)$, j=0, 1 are only defined when $b_i \neq 0$. These functions represent the probabilities of declaring $\mathcal{H}_1$ in a group-test defined by b with threshold $\gamma$ and given $s_i=j$, j=0, 1. Notice that the error probabilities $\alpha$, $\beta$ refer to each binary hypothesis testing defined in Equation 30. The notation for $\beta_i(b, \gamma; s_i)$ indicates the probability of having a missed-detection conditioned on the state $s_i$ of one of the resources. It then follows that $$\alpha_i^{GT}(B, \gamma) \triangleq 1 - F_{PBD}\left(\left\lceil\frac{|B_i|}{2}\right\rceil - 1; |B_i|, \{\pi_0(i, b_k, \gamma_k) : k \in B_i\}\right) \quad \text{EQ. 36}$$

$$\beta_i^{GT}(B, \gamma) \triangleq F_{PBD}\left(\left\lceil\frac{|B_i|}{2}\right\rceil - 1; |B_i|, \{\pi_1(i, b_k, \gamma_k) : k \in B_i\}\right) \quad \text{EQ. 37}$$

where $F_{PBD}(k; n; p)$ indicates the cumulative distribution function of a Poisson binomial distribution parameterized by $p \in [0; 1]^n$. One can then replace Equations 36 and 37 in Equation 15 to solve the optimization in Equation 16, where the equivalence between the decision rules $\delta$ and the selection of the thresholds $\gamma$ is essentially the same as for the DI case.

Notice that in order for Equations 36 and 37 to hold, each of the tests must be independent, conditioned on the state of the resource i. This is true if the sensing matrix, in the language used for LDPC codes, does not have length-4 cycles; that is, two different measurements do not mix more than one sub-band in common. Such a condition is typically required for belief propagation algorithms, for example, message passing, which suffer from loopy networks with short cycles.

The optimization remains extremely complex due to the complexity of the decision space for B and the sum of an exponentially growing number of terms for the probabilities defined in Equations 36 and 37. Nevertheless, it gives a method to evaluate the objective of the optimization for any sensing matrix B, where the optimization over $\gamma$ can be numerically solved. Equations 36 and 37 are monotonic functions of the probabilities $\pi_0$, $\pi_1$ defined in Equations 34 and 35, which are monotonic in the $\gamma_k$'s, and therefore a unique solution for $\gamma$ exists. Next, additional constraints to Equation 16 are introduced, in particular on the structure of B, in order to evaluate whether GT strategy is superior to the DI approach.

Note that a maximum likelihood (ML) or a maximum a posteriori probability estimator, for a rank-deficient sensing matrix, does not provide optimality guarantees in terms of minimum error probability or minimum Bayesian risk. Nevertheless, for the same sensing matrix, the maximum a posteriori probability estimator is expected to outperform the binary GT hypothesis in Equation 30 by simply adding more degrees of freedom to the decision in the κ-th dimensional space of the observations. Therefore, the evaluation of the objective in Equation 16 via Equations 36 and 37 provides a benchmark for the utility obtainable with a more refined detection method.

1. The pairwise tests case: To start, matrices B are considered that have the following property: each resource is sensed only one time, either directly inspected or mixed with another resource, and no test mixes more than two resources, that is, $|\mathcal{A}_k| \le L=2$, $|\mathcal{B}_i| \le 1$ $\forall k=1, \ldots, \kappa$, $i=1, \ldots, N$. Consider the test that mixes entries i and j. According to the strategy derived at the beginning of the section, one can use Equations 34, 35, 36, and 37 to write out the per-time instant utility obtainable after the decision. First, from Equation 30, without prior knowledge over $\varphi_i$, $\varphi_j$ other than the threshold $\varphi_{min}$, the best choice to minimize $\alpha$ is to set $b_i = b_j$. This false alarm probability is referred to as $\alpha_{ij}$). Therefore, similar to the DI case, one can consider binary coefficients for $b_k$, that is, $b_{ki} \ne 0 \rightarrow b_{ki} = 1$. This holds true also for the extension of L>2 and gives implementation advantages as discussed in Section I, B.

A missed detection event in Equation 30 can occur for three different states of the resources i, j; an upper-bound for the corresponding miss detection probability is established by always considering $\theta = \theta_{min}$ and is referred to as $\beta_{ij,max}$. What is obtained is the following:

$$u_{ij}^{GT} \triangleq \omega_i \omega_j (r_i + r_j)(1 - \alpha_{ij}) + [(\omega_i(1-\omega_j)(r_i + \rho_j) + \omega_j(1-\omega_i)(r_j + \rho_i) + (1-\omega_i)(1-\omega_j)(\rho_i + \rho_j))]\beta_{ij,max} \quad \text{EQ. 38}$$

where the threshold for this test $\gamma_{ij}$ has been set to maximize Equation 38, that is, $$\gamma_{ij} = \frac{\omega_i \omega_j (r_i + r_j)}{(1-\omega_i)(|\rho_i| - \omega_j r_j) + (1-\omega_j)(|\rho_j| - \omega_i r_i)}. \quad \text{EQ. 39}$$

Consider then a graph in which each resource is a vertex and the edge weight $u_{ij}$ between two vertices ij is the utility (per time instant) $u_{ij}^{GT}$ just defined. The weight of the loops $u_{ii}^{GT}$ are given by $u_i^{DI}$ in Equation 26. The problem can then be translated into a particular instance of a max-cut problem: picking a subset of the edges and forming a subgraph, in which each edge represents a test, to maximize the objective in Equation 16. Formally, the equation can be written as follows:

$$\underset{\varepsilon}{\text{maximize}} \quad U^{GT}(\varepsilon) \quad \text{EQ. 40}$$

subject to $\deg_\varepsilon(i) \le i \; \forall i \in \mathcal{N}$ where $$U^{GT}(\varepsilon) \underset{\Delta}{=} (K - |\varepsilon|) \left( \sum_{ij \in \varepsilon} u_{ij}^{GT} \right) \quad \text{EQ. 41}$$

and $\deg_\varepsilon(i)$ is the nodal degree of node i induced by the undirected graph $\mathcal{G} = (\mathcal{N}, \varepsilon)$. It is possible to map the constraint on the nodal degree in the objective of Equation 40 by adding a penalty for the violation of such constraint. This guarantees that the optimal solution will be equivalent to Equation 40, that is, no set of edges that violates the constraint can improve the objective, and any feasible set of edges would have the same objective in the two problems. The optimization can be rewritten as follows:

$$\underset{\varepsilon}{\text{maximize}} \quad U^{GT}(\varepsilon) - M \sum_{i \in \mathcal{N}} \Upsilon(\deg \varepsilon(i)) \quad \text{EQ. 42}$$

where $$\Upsilon(n) \underset{\Delta}{=} \begin{cases} 0 & \text{for } n \le 1 \\ n-1 & \text{for } n \ge 2 \end{cases} \quad \text{EQ. 43}$$

and M is a positive constant.

Lemma 2:

For M>0, the objective in Equation 42 is a non-monotone sub-modular function of $\varepsilon$, and it is possible to find M*>0 such that for any M>M* the two optimizations of Equations 40 to 42 are equivalent.

The extension of this result for L>2 can now be discussed to develop a general algorithm that leverages the sub-modularity of the optimum design problem in Equation 40.

2. Extension to L>2: If more than two channels are mixed, instead of just edges or self-loops to indicate the tests, cycles of length can be obtained up to L. The nodal degree in Equation 42 then is interpreted as the number of cycles to which a node belongs, and the set of edges is replaced with the set of cycles. The set $\varepsilon$ of edges is then replaced with the set C of possible cycles, and use c to indicate the generic cycle, which could be a self-loop, an edge, or a cycle with length 3 or greater. With these substitutions the proof of sub-modularity in Lemma 2 naturally extends to this case as well. In light of the constraint $|\mathcal{B}_i| \le 1$, no node can be in two cycles.

---

Algorithm 1: Greedy Maximization of $U^{GT}(\mathcal{C})$

---

1: Initialize: $\mathcal{C} = \emptyset$.
2: While $\exists \; C \in \mathcal{C}$ such that $\partial_c U^{GT}(\mathcal{C}) > 0$
3:      Find $c^* = \arg\max_{c \in \mathcal{C}} \partial_c U^{GT}(\mathcal{C})$
4:      $\mathcal{C} \leftarrow \mathcal{C} \cup C^*$
5: End

---

3. The factor approximation of the greedy algorithm: Having proved the sub-modularity of Equation 42 in Lemma 2, it is natural to resort to a greedy procedure; however, it is important to highlight that the objective in Equation 42 does not respect the non-negativity property. Due to the particular structure of the problem, it is possible to find a factor approximation for the output of the greedy algorithm.

Lemma 3:

Algorithm 1 guarantees an $\alpha$-constant factor approximation of the optimal solution for Equation 42, where $$\alpha = \frac{1}{\min\left\{L_{\text{eff}}, \frac{K}{2}\right\}} \frac{K-1}{K - \min\left\{L_{\text{eff}}, \frac{K}{2}\right\}}. \quad \text{EQ. 44}$$

Note that $$\partial_{C'} U^{GT}(\mathcal{C}) = \sum_{C \in \mathcal{C}} u_C + (K - |\mathcal{C}| - 1) u_{C'} \quad \text{EQ. 45}$$

so, as long as the number of tests $|C|$ added in the greedy maximization is less than the time horizon K, then $$\arg \max_{c \in \mathcal{C}} \partial_C U^{GT}(\mathcal{C}) = \arg \max_{c \in \mathcal{C}} u_C \quad \text{EQ. 46}$$

This relation indicates that, in the greedy procedure, edges are added in decreasing order of utility, respecting the constraint on the nodal degree in light of Lemma 2. Also, from Equation 45, it is easy to find that the optimal $|C|$ never exceeds $$\left\lceil \frac{K-1}{2} \right\rceil.$$

In the greedy procedure in Algorithm 1, there is a constant number of operations per query, which indicates the overall complexity of the algorithm is dominated by the sorting of all possible cycles' utilities. In the worst case, sorting n values require $O(n^2)$ operations, thus the complexity is given by $$O\left(\left(\sum_{\ell=1}^{L}\binom{n}{\ell}\right)^2\right),$$

that is, polynomial in N and exponential in L.

C. Additional Applications of the Stochastic Optimization

The analysis for the factor approximation of the greedy strategy transcends the spectrum-sensing application discussed in the present disclosure. Group testing has been applied to a number of disparate contexts to model the outcome of sequential tests. As long as one has a way to define the per-time utility derived from each test as in Equation 38 and an overall utility as in Equation 41, then the results of the present disclosure can be applied. Classes of problems that can be formulated in a similar way include job scheduling for data centers, design of parity checks for rateless coding, and dynamic advertisement that promotes an offer that bundles two products/services together, for example. Obviously, in all these cases the statistics of the observations are radically different.

IV. Approximate Maximum Likelihood Estimate for Mixed Tests

The previous sections have provided methods that find a low-density measurement matrix. As will be apparent in the numerical results in Section V, the noise-folding phenomenon justifies the use of sparse-sensing matrices. They are also ideal when one wants to apply belief propagation to the decision problem. However, for the sake of comparison, an approach is proposed here which can be applied to any measurement matrix B and that can be mapped into previous solutions.

Assume that K measurements have been collected, by mixing a set $\mathcal{A} \subseteq \mathcal{N}$ of sub-bands. One could ignore the prior $\omega_i$ and derive the maximum likelihood (ML) estimate for $\varphi$. The log-likelihood function is as follows:

$$\log(f(y \mid \varphi_A)) = -\sum_{k=1}^{K} \log \theta[k] + \frac{y[k]}{\theta[k]} \stackrel{\theta[k] \to y[k]}{\approx} \quad \text{EQ. 47}$$

$$-\sum_{k=1}^{K} 1 + \log y[k] + \frac{1}{2}\left(\frac{y[k] - \theta[k]}{y[k]}\right)^2$$

where the linearization corresponds to the Taylor expansion of the likelihood function around the observations mean (recall Equations 14 and 15). A possible approach consists in solving the following LASSO problem:

$$\hat{\varphi}_A = \underset{\varphi_A}{\arg\min} \; \|\lambda_A \varphi_A^T\|_1 + \frac{1}{2}\|(y - B(\varphi_A^T + n_A^T))\|_{C^{-1}}^2 \quad \text{EQ. 48}$$

with C=diag(y) denoting the covariance of the observations and $\lambda_A$ the vector of weights for the weighted $\ell_1$-norm. The first penalty term in the objective enhances sparsity, while the second term comes from the ML estimate in Equation 47.

To incorporate the information of the prior beliefs $\omega_i$, one can set $\lambda_i = \Upsilon_{i,i}$ from Equation 20, $\forall i \in \mathcal{A}$, to favor the estimates $\varphi_i > 0$ for entries with lower thresholds $\gamma_i$. Alternatively, one can also set $\lambda_i = \lambda \forall i \in \mathcal{A}$.

V. Simulation Results

This section showcases the ability of the approach of the present disclosure to dynamically switch between a DI receiver (scanning receiver) and a GT approach, based on the expected occupancy (the vector of priors $\omega$), the time available K, the minimum SNR threshold $$SNR_{min} = \frac{\varphi \min}{w},$$

and the number of resources N. In the context of spectrum sensing (case 0), the parameters $r_i$ and $\rho_i$ can be mapped into a maximization of the overall weighted network throughput: the reward $r_i$ can be proportional to the achievable rate over the channel i in the absence of primary user communications, that is, $r_i \propto \log(1+SNR_{i,S})$, where the suffix S indicates the secondary communication, whereas the penalty $\rho_i$ can be made proportional to the loss in rate caused to the primary communication due to the interference added by the secondary.

For the cognitive radio application, the concept of exploitation of the resource is tied to the definition of utility function chosen in Equation 15, which is expressed in bits /s/ $Hz$. From Equations 15 and 16, $r_i$'s and $\rho_i$'s can be normalized over the communication bandwidth without altering the optimization. The longer the time available to transmit, the larger the number of bits that can be transmitted over that band.

For the other case, that is, when the reward comes from detecting correctly which resources are busy, for example, a RADAR application, it is not immediately clear why the utility would be proportional to the number of remaining time instants. To interpret this, the action upon declaration of $s_i=1$ is modelled as a Bernoulli trial that accrues a reward $r_i$ if such action is successful, that is, the target is actually hit, and this happens with a certain probability $\rho_i$ for each attempt. The number of attempts $T_i$ necessary to hit the target is then geometrically distributed. One can find then that the expected reward is equal to $$r_i P(T_i \leq (K-\kappa)) = r_i \sum_{k=1}^{K-\kappa} p_i (1-p_i)^{k-1} =$$
$$r_i (1-(1-p_i)^{K-\kappa}) \approx (K-\kappa) r_i p_i$$

for small $p_i$, which would motivate having an expected utility that increases linearly with time. The $\rho_i$ associated with this case models an intervention cost, the main purpose of which is to limit the false alarm rate.

It is important to highlight, however, that the time dependency in the optimization objective prevents the formulation from returning to a standard constant false alarm rate (CFAR) detection method. Nevertheless, the model can apply to electronic warfare (tentatives of creating jamming), wake-up radio, and other problems where the action (and the associated utility) is on the channels that are declared busy.

For all the figures, reference is made to L=2, 3 as the maximum number of resources per test allowed in the greedy procedure in Algorithm 1. Theoretically, the optimal value for $U^{GT}$ monotonically increases with L since increasing L introduces additional degrees of freedom. However, the simulations used the greedy solution and, as proved in Lemma 3, the approximation factor of the greedy maximization is potentially worse for higher values of L, as the following numerical results show.

"Group Testing" indicates the utility obtained with the GT approach. The maximum a posteriori probability estimator (MAP estimator) is the estimator that knows the true values $\Phi_i$, uses the same matrix B of the GT approach, but then decides on each resource based on the posterior for $\omega_i$, using belief propagation.

1. Spectrum sensing vs. RADAR: Even though in light of the symmetry in the definition of the threshold $\gamma_i$ one can switch the r's and $\rho$'s to go from spectrum sensing (case 0) to RADAR (case 1) and find the same trends, even for the combined tests, to avoid confusion, the difference in the two scenarios is highlighted in the first simulation presented in FIGS. 4A and 4B.

Figure 4A:
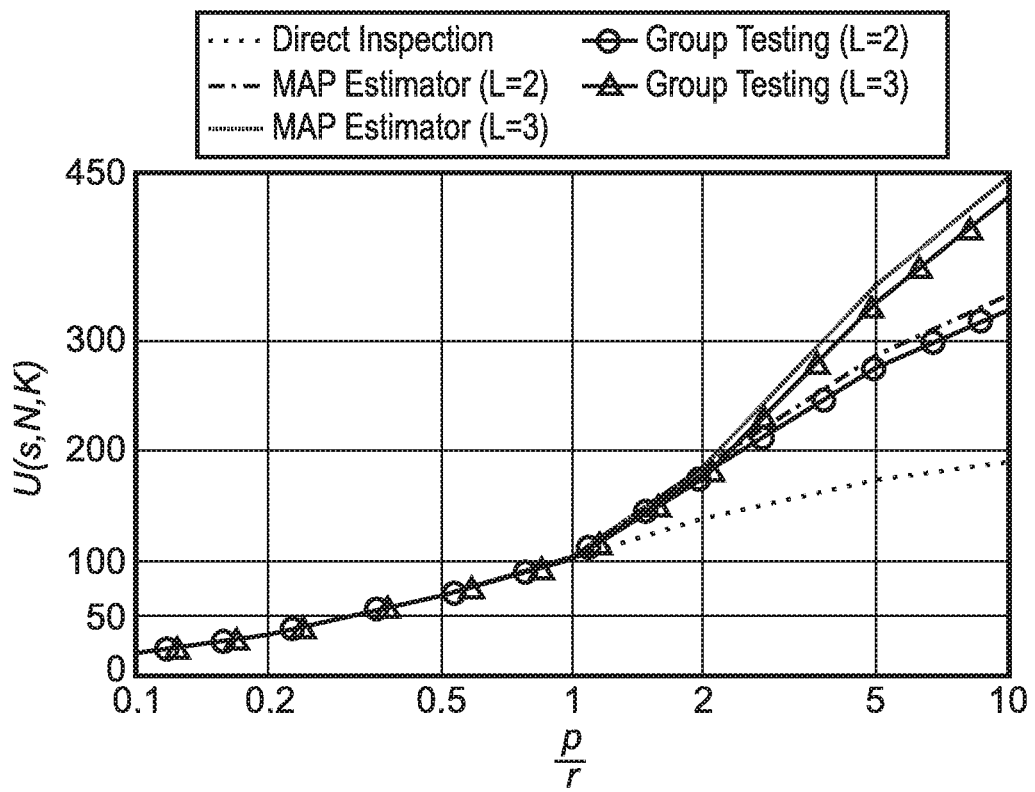
FIG. 4A is a graphical representation comparing utility for different optimization approaches for a spectrum sensing application.
Figure 4B:
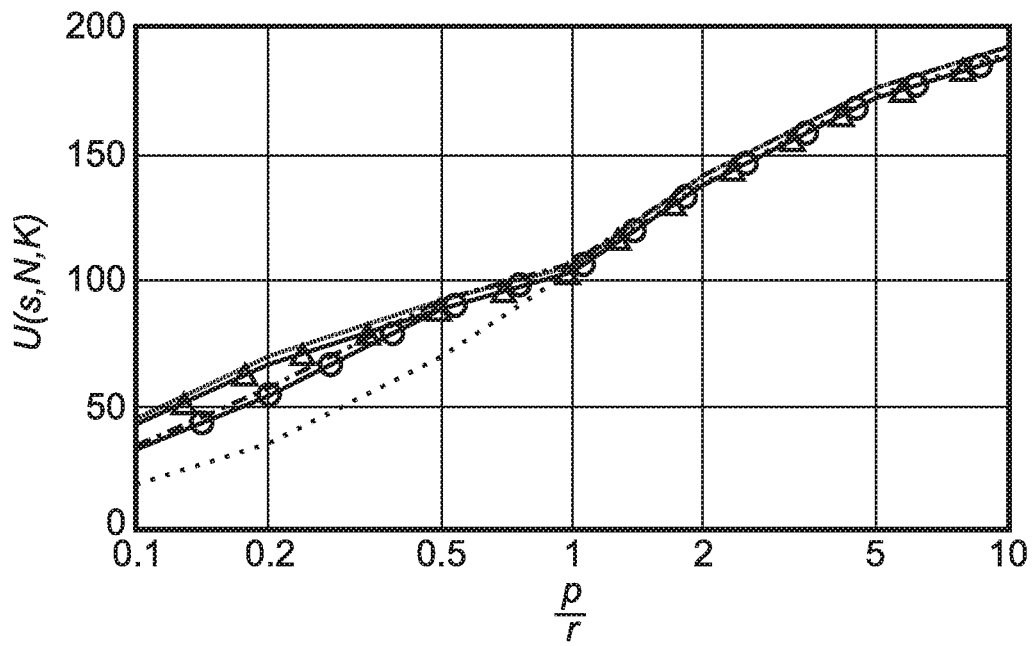
FIG. 4B is a graphical representation comparing utility for different optimization approaches for a RADAR application.

FIG. 4A is a graphical representation comparing utility for different optimization approaches for the spectrum sensing application. FIG. 4B is a graphical representation comparing utility for different optimization approaches for the RADAR application.

For the experiment in FIGS. 4A and 4B, the following were set—K=30, N=60, and $r_i$=r, $\rho_i$=$\rho$, and $\omega_i$=$\omega$, $SNR_i$=$SNR_{min}$(10 dB) $\forall i-\mathcal{N}$ —so that we have that for $\omega$ equal to $$\frac{\rho}{\rho+r} \text{ or } \frac{r}{\rho+r}$$

for case 0 and case 1, respectively. These are the threshold values given in Assumption 1 to guarantee that no resource can give positive utility if not tested. In both scenarios the utility increases with the ratio $$\frac{\rho}{r},$$

since the prior probability that favors a positive utility function increases as well for both the spectrum-sensing and RADAR applications.

However, the gain for the GT approach over the DI approach happens in complementary ranges: when $$\frac{\rho}{r} > 1$$

for the spectrum-sensing application and when $$\frac{\rho}{r} < 1$$

in the RADAR application. When the penalty increases with respect to the reward, the GT approach for spectrum sensing is conservative and does not transmit in any of the channels in a group that tested positively; nevertheless, as the priors $\omega_i$ increase, it is possible to find multiple empty sub-bands with just one test and gain in utility compared with the DI approach.

For the RADAR application, when the penalty increases with respect to the reward, there is a disadvantage in declaring as busy all the elements in the test, even if the prior $\omega$ decreases. Clearly, this limits the benefit of combined tests, whereas when $$\frac{\rho}{r}$$

decreases, there is a gain since one element found busy in the pool guarantees higher reward. Apart from this asymmetry, both cases show the same trends in utility over the number of available resources N, and the value of $SNR_{min}$.

Figure 5A:
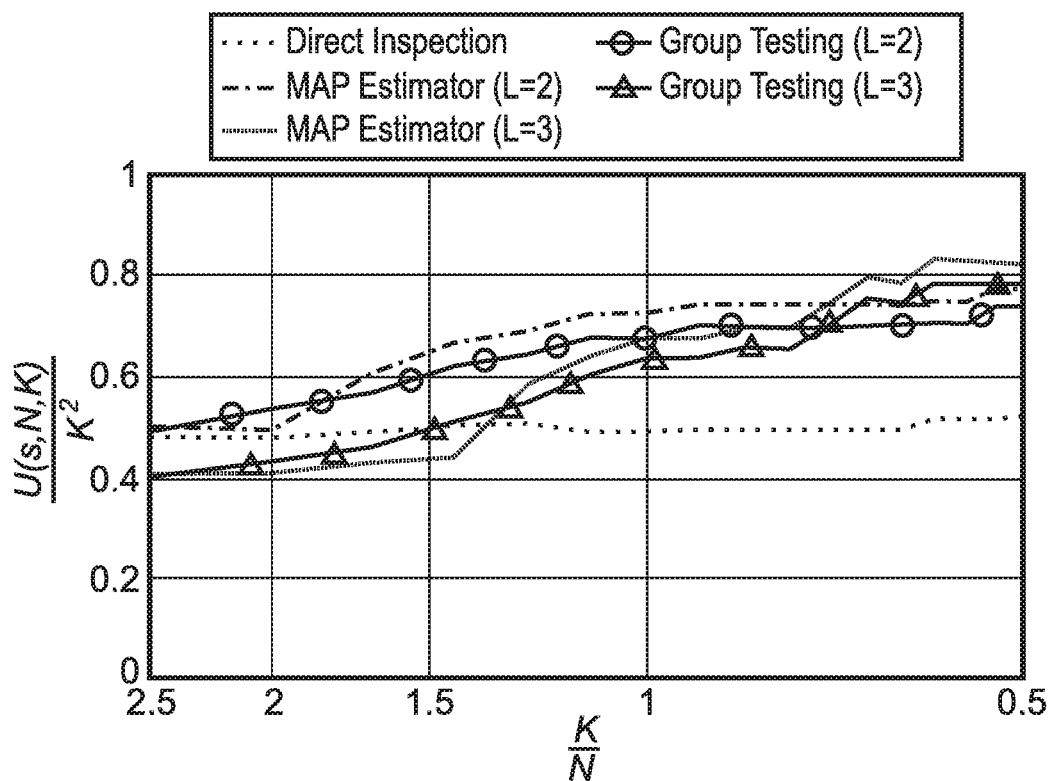
FIG. 5A is a graphical representation comparing utility for different optimization approaches versus a ratio horizon K over a number of resources N with the horizon K equal to 10.
Figure 5B:
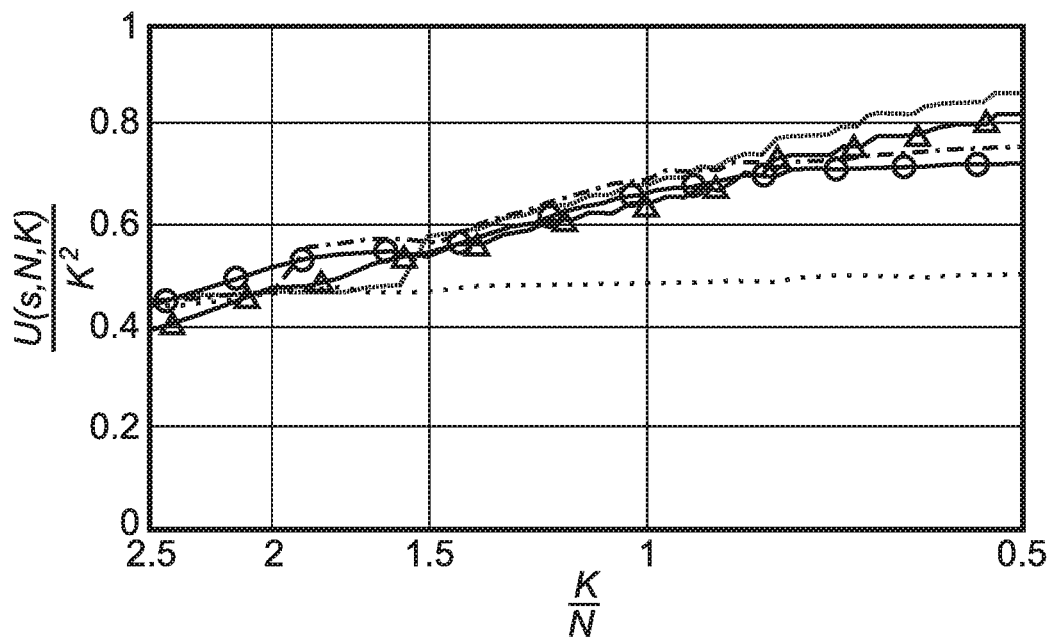
FIG. 5B is a graphical representation comparing utility for different optimization approaches versus the ratio horizon K over the number of resources N with the horizon K equal to 30.

2. Utility for different N: FIG. 5A is a graphical representation comparing utility for different optimization approaches versus a ratio horizon K over a number of resources N with the horizon K equal to 10. FIG. 5B is a graphical representation comparing utility for different optimization approaches versus the ratio horizon K over the number of resources N with the horizon K equal to 30.

FIGS. 5A and 5B thus plot the utility (normalized over $K^2$) over the ratio $$\frac{K}{N}$$

for two different horizons, that is, K=10 and K=30 and $SNR_{min}$=10 dB. Only for $$\frac{K}{N} \lesssim 0.75,$$

the GT approach outperforms all competing options, whereas when the horizon K increases, almost no benefit comes from mixing resources. This suggests that there is enough time to test them independently with high accuracy. This experiment looked at case 0 and set $$\omega_i \sim \left(0.7, \frac{\rho i}{\rho_i + r_i}\right), \text{ where}$$

$$r_i = \log(1 + SNR_{i,S}) \text{ and } \rho_i = 5r_i \text{ with } SNR_{i,S_{dB}} \sim \mathcal{U}([10, 20]).$$

The SNR for the test, $$\frac{\varphi_i}{n_i},$$

is generated uniformly between 10 dB and 20 dB; recall that the only information used in the algorithm is the minimum SNR value, that is, in this case 10 dB. In the regime considered, the DI approach is approximately constant since it is easy to show $$U^{DI,OPT} \leq \frac{K^2}{4} u_{max}$$

irrespective of N.

Figure 6A:
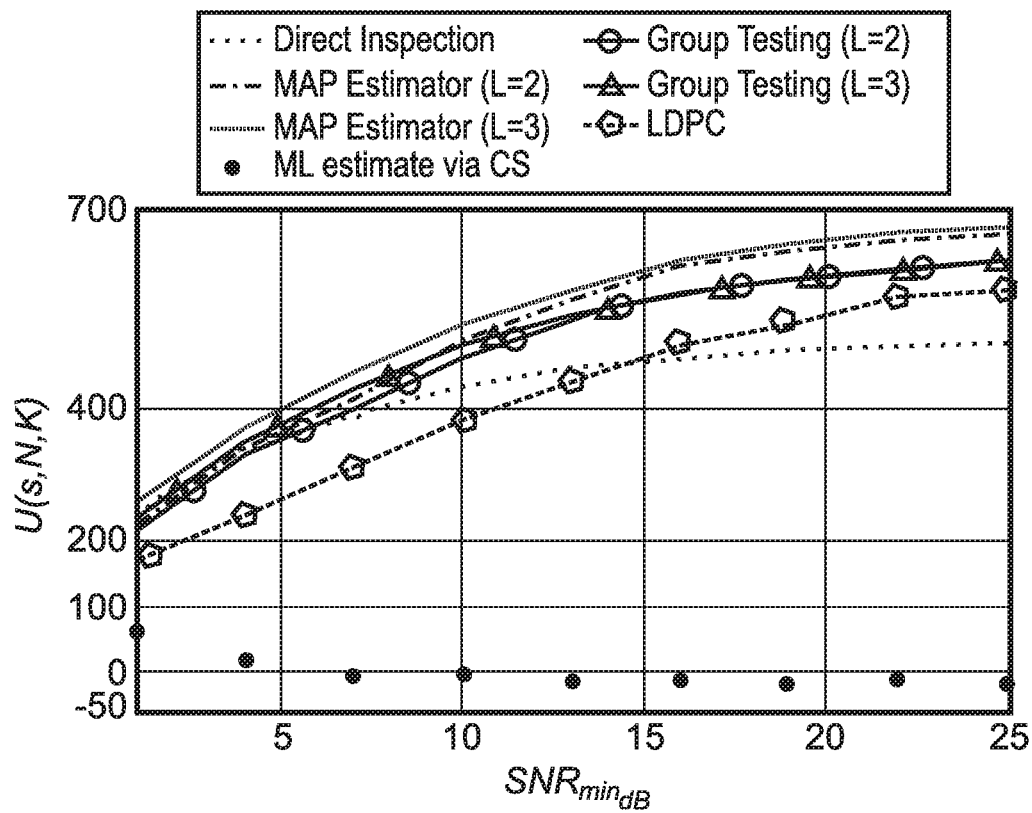
FIG. 6A is a graphical representation comparing utility for different optimization approaches versus a minimum signal-to-noise ratio (SNR) with the horizon K equal to 30.
Figure 6B:
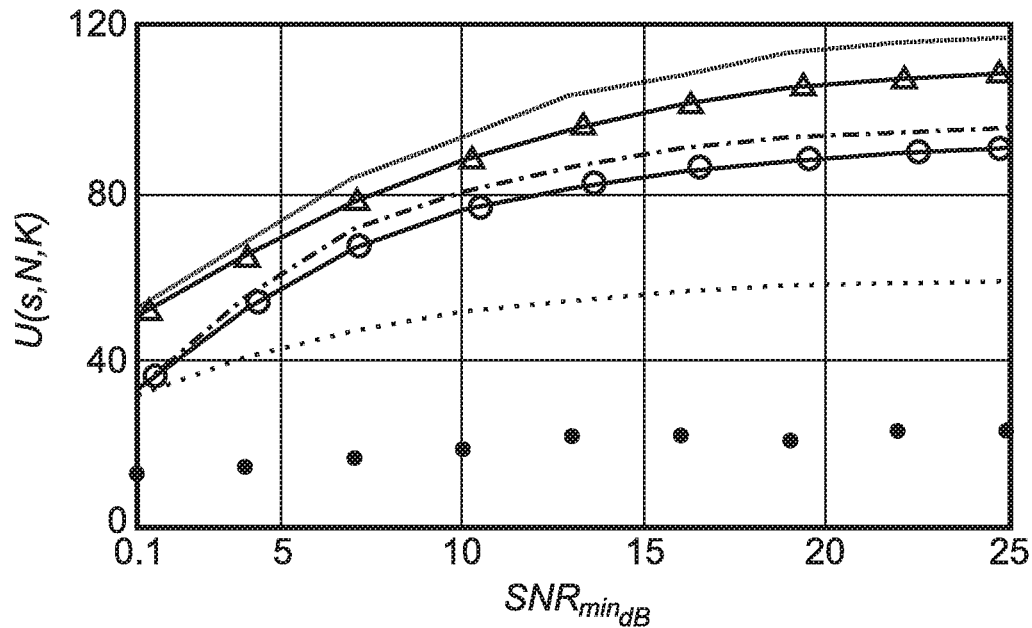
FIG. 6B is a graphical representation comparing utility for different optimization approaches versus the minimum SNR with the horizon K equal to 10.

3. Utility for different $SNR_{min}$: FIG. 6A is a graphical representation comparing utility for different optimization approaches versus the minimum SNR with the horizon K equal to 30. FIG. 6B is a graphical representation comparing utility for different optimization approaches versus the minimum SNR with the horizon K equal to 10. This set of experiments studied how the utility behaves versus the minimum SNR in each active sub-band. In this case the SNR was drawn uniformly between $SNR_{min_{dB}}$ and $SNR_{min_{dB}}+10$, and once again only the value of $$SNR_{min} = \frac{\varphi_{min}}{w}$$

was used in the optimization, which is shown in the abscissa of the figures. Matching intuition, the GT approach outperformed the DI approach only when $SNR_{min}$ was sufficiently high and the gain in utility was larger for K=10 than for K=30.

For this experiment the number of resources was fixed to N=20 and, as previously highlighted, increasing K for fixed N diminishes the benefit of combining resources in a test. In this case the utility was also plotted that was obtainable with the approximate ML estimate obtained via compressive sensing, described in Section IV. For this case, to illustrate the noise-folding issue, a dense matrix that had the same aspect ratio of the one found via the GT approach was used, that is, one that scans the same set of resources for the same number of tests.

To show reasonable results, only for the ML estimate via compressive sensing, the mean of y[k] over 10 samples was taken. Despite having more measurements, such approach gives a much lower utility than the DI and the GT approach of the present disclosure due to the negative effect of noise folding. For K=30, the approach of the present disclosure was also compared with the performance obtained using belief propagation in a loopy network and an LDPC matrix. Considering N=20 resources and an expected sparsity approximately equal to 4, a regular LDPC matrix was chosen with a row weight of 5 and a column weight of 3, resulting in 12 tests. The LDPC was not implemented for K=10 since the constraints on the regularity would have given either a diagonal matrix (same as DI) or a relatively dense matrix. The absence of any optimization in the choice of which and how many resources to test produces a utility that, for low SNR, is lower than the DI approach proposed. For a high enough SNR, the LDPC design can outperform the DI approach but still gives a utility lower than the GT strategy with L=2. This highlights the benefit of having an active sub-Nyquist receiver compared with a static offline selection of the parameters.

The various illustrative logical blocks, modules, and circuits described in connection with the embodiments disclosed herein may be implemented or performed with a processor, a digital signal processor (DSP), an application specific integrated circuit (ASIC), a field programmable gate array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, electrically programmable ROM (EPROM), electrically erasable programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

Those skilled in the art will recognize improvements and modifications to the preferred embodiments of the present disclosure. All such improvements and modifications are considered within the scope of the concepts disclosed herein and the claims that follow.

What is claimed is:

1. A radio frequency (RF) receiver, comprising:
a dynamic modulator configured to modulate a received signal such that one or more portions of the received signal are dynamically selected and folded into a baseband of a modulated signal;
an energy detector configured to sample an energy of the modulated signal at a sub-Nyquist rate; and
a controller configured to adjust the dynamic modulator based on an output of the energy detector.

2. The RF receiver of claim 1, wherein the output of the energy detector is a past sample of the energy of the modulated signal.

3. The RF receiver of claim 1, wherein the dynamic modulator is further configured to modulate the received signal with a mixture of sinusoidal components whose frequencies and amplitudes are dynamically adjusted by the controller across multiple time windows to select the one or more portions of the received signal.

4. The RF receiver of claim 1, wherein the energy detector samples the energy of the modulated signal at the sub-Nyquist rate by low-pass filtering and sampling the baseband of the modulated signal.

5. The RF receiver of claim 1, wherein the dynamic modulator comprises a set of voltage-controlled oscillators (VCOs).

6. The RF receiver of claim 5, wherein a voltage level of each of the set of VCOs is proportional to a coefficient of a sensing matrix output by the controller, thereby generating a sinusoidal signal around a selected frequency.

7. The RF receiver of claim 1, wherein the dynamic modulator comprises a plurality of fixed frequency oscillators, each fixed frequency oscillator being controlled by the controller.

8. The RF receiver of claim 1, wherein the energy detector comprises:
 a low pass filter coupled to an output of the dynamic modulator; and
 a sampling circuit coupled to an output of the low pass filter.

9. The RF receiver of claim 8, wherein the sampling circuit is configured to sample the modulated signal after the low-pass filter at intervals based on a bandwidth of the baseband.

10. An analog front end for a radio frequency (RF) receiver, comprising:
 a dynamic modulator configured to convert an incoming RF signal having a first bandwidth to a modulated signal by:
  selecting a set of sub-bands of the first bandwidth; and
  dynamically folding spectral content of the incoming RF signal in the set of sub-bands into a baseband of the modulated signal; and
 an energy detector configured to sense signal energy of the modulated signal within the baseband;
 wherein the set of sub-bands is selected as a function of a past output of the energy detector.

11. The analog front end of claim 10, further comprising a controller configured to determine occupancy of a set of RF channels based on the energy detector sensing signal energy above a threshold.

12. The analog front end of claim 11, wherein the controller is further configured to adjust the dynamic modulator based on the occupancy of the set of RF channels.

* * * * *